US011601879B2

(12) United States Patent
Murakami et al.

(10) Patent No.: US 11,601,879 B2
(45) Date of Patent: Mar. 7, 2023

(54) RADIO COMMUNICATION METHOD AND BASE STATION

(71) Applicant: NIPPON TELEGRAPH AND TELEPHONE CORPORATION, Tokyo (JP)

(72) Inventors: Tomoki Murakami, Musashino (JP); Toshiro Nakahira, Musashino (JP); Hirantha Abeysekera, Musashino (JP); Akiyoshi Inoki, Musashino (JP); Keisuke Wakao, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/976,454

(22) PCT Filed: Feb. 25, 2019

(86) PCT No.: PCT/JP2019/007042
§ 371 (c)(1),
(2) Date: Aug. 27, 2020

(87) PCT Pub. No.: WO2019/167880
PCT Pub. Date: Sep. 6, 2019

(65) Prior Publication Data
US 2021/0007045 A1 Jan. 7, 2021

(30) Foreign Application Priority Data
Mar. 2, 2018 (JP) .............................. JP2018-038014

(51) Int. Cl.
*H04W 48/20* (2009.01)
*H04B 7/06* (2006.01)
(Continued)

(52) U.S. Cl.
CPC .......... *H04W 48/20* (2013.01); *H04B 7/0628* (2013.01); *H04B 7/0689* (2013.01);
(Continued)

(58) Field of Classification Search
CPC . H04W 48/20; H04W 74/0808; H04W 84/12; H04W 88/08; H04W 74/0816;
(Continued)

(56) References Cited

U.S. PATENT DOCUMENTS

2012/0134279 A1* 5/2012 Tamaki .................. H04B 7/024
370/248
2012/0179810 A1 7/2012 Contreras Delpiano et al.
(Continued)

FOREIGN PATENT DOCUMENTS

JP   2009-246476 A   10/2009
JP   2013-197820 A   9/2013
(Continued)

OTHER PUBLICATIONS

IEEE Std 802.11ac-2013, Dec. 2013.
(Continued)

*Primary Examiner* — Ashley Shivers
(74) *Attorney, Agent, or Firm* — Harness, Dickey & Pierce, P.L.C.

(57) ABSTRACT

[Problem] The base station includes a plurality of radio communication units configured to individually support a plurality of communication capabilities, and performs, for a terminal station that is connected to the base station, control for selecting a radio communication unit based on a communication scheme supported in the terminal station.
[Solution] Provided is a radio communication method for a radio communication system including a plurality of base stations provided with a plurality of radio communication units for which different communication schemes are set-
(Continued)

table, and a terminal station configured to perform radio communication with the radio communication unit of the base station by using a specific communication scheme. The radio communication method includes setting, at the base station, for the radio communication units, different communication schemes based on a setting policy of the communication scheme, and a switching policy used for selecting the radio communication unit to which the terminal station is to be connected, collecting, at the base station, communication scheme information on a communication scheme selectable by the terminal station, when the terminal station establishes a connection or a reconnection with the base station, selecting, at the base station, a radio communication unit to which the terminal station is to be connected, in accordance with the communication scheme information, the setting policy, and the switching policy, and updating, at the base station, the setting policy and the switching policy for the radio communication unit.

7 Claims, 9 Drawing Sheets

(51) Int. Cl.
*H04W 84/12* (2009.01)
*H04W 88/08* (2009.01)
*H04W 74/08* (2009.01)

(52) U.S. Cl.
CPC ........ *H04W 74/0808* (2013.01); *H04W 84/12* (2013.01); *H04W 88/08* (2013.01)

(58) Field of Classification Search
CPC .... H04W 48/18; H04W 88/10; H04B 7/0628; H04B 7/0452; H04B 7/0689
See application file for complete search history.

(56) References Cited

U.S. PATENT DOCUMENTS

| | | |
|---|---|---|
| 2014/0113640 A1 | 4/2014 | Sachs et al. |
| 2015/0055572 A1 | 2/2015 | Ishikura et al. |
| 2016/0315738 A1* | 10/2016 | Huang ................. H04L 5/0094 |
| 2017/0034710 A1 | 2/2017 | Shu et al. |
| 2021/0007045 A1 | 1/2021 | Murakami et al. |

FOREIGN PATENT DOCUMENTS

| | | |
|---|---|---|
| JP | 2014-507089 A | 3/2014 |
| JP | 2015211237 A | 11/2015 |
| WO | WO-2012-097102 A1 | 7/2012 |

OTHER PUBLICATIONS

International Search Report (English and Japanese) issued in PCT/JP2019/007042, dated May 28, 2019; ISA/JP.
International Search Report (English and Japanese) issued in PCT/JP2019/007043, dated May 28, 2019; ISA/JP.

* cited by examiner

| TYPE | SISO TRANSMISSION OR SU-MIMO TRANSMISSION | MU-MIMO TRANSMISSION | RTS/CTS or MU-RTS/CTS | BA or MU-BA |
|---|---|---|---|---|
| 1 | ○ | × | RTS/CTS | BA |
| 2 | ○ | ○ | RTS/CTS | BA |
| 3 | ○ | ○ | MU-RTS/CTS | MU-BA |

| TYPE | SISO TRANSMISSION OR SU-MIMO TRANSMISSION | MU-MIMO TRANSMISSION | RTS/CTS or MU-RTS/CTS | BA or MU-BA | SETTING POLICY |
|---|---|---|---|---|---|
| 1 | ○ | × | RTS/CTS | BA | POLICY 1 |
| 2 | ○ | ○ | RTS/CTS | BA | |
| 3 | ○ | ○ | MU-RTS/CTS | MU-BA | POLICY 2 |

| | SWITCHING POLICY |
|---|---|
| FIRST TERMINAL STATION 20 | TYPE 1 |
| SECOND TERMINAL STATION 30 | TYPE 2 | POLICY 1 |
| THIRD TERMINAL STATION 30-1 | TYPE 3 | |
| THIRD TERMINAL STATION 30-2 | | POLICY 2 |
| THIRD TERMINAL STATION 30-3 | | |

RADIO COMMUNICATION METHOD AND BASE STATION

CROSS-REFERENCE TO RELATED APPLICATIONS

This application is a 371 U.S. National Phase of International Application No. PCT/JP2019/007042, filed on Feb. 25, 2019, which claims priority to Japanese Application No. 2018-038014, filed on Mar. 2, 2018. The entire disclosures of the above applications are incorporated herein by reference.

TECHNICAL FIELD

The present invention relates to a radio communication method and abase station, in which the base station includes a plurality of radio communication units configured to individually support a plurality of communication capabilities, and performs, for a terminal station that is connected to the base station, control for selecting a radio communication unit based on a communication scheme supported in the terminal station.

BACKGROUND ART

The high-speed radio access systems using radio waves in 5 GHz band include systems based on the IEEE 802.11a standard, 11n standard, and 11ac standard. In the 11a standard, a transmission rate of up to 54 Mbit/s is achieved by stabilizing characteristics in multipath fading environment based on the orthogonal frequency division multiplexing (OFDM) modulation scheme. In the 11n standard, a transmission rate of up to 600 Mbit/s is achieved by using Multiple Input Multiple Output (MIMO) in which a plurality of antennas is used to perform space division multiplexing on an identical radio channel, and a channel bonding technique in which two 20 MHz frequency channels are simultaneously used to utilize 40 MHz frequency channel. In the 11ac standard, higher speed and more efficient radio communication compared to the 11n standard is achieved by utilizing a channel bonding technique in which up to eight 20 MHz frequency channels are simultaneously used to utilize up to 160 MHz frequency channel, a downlink multi-user MIMO technology in which different signals are simultaneously transmitted to a plurality of destinations on an identical radio channel, and the like (Non Patent Literature 1).

Now, a formulation of IEEE 802.11ax standard has also been advanced, which focuses on the improvement of transmission efficiency in addition to the increase in transmission rate. In the 11ax, it is planned that the spatial frequency reuse by simultaneous transmission is enhanced, the efficiency of OFDM modulation scheme is improved, and OFDMA transmission on up and down links and multi-user MIMO transmission on uplink are used as multi-user transmission.

Moreover, in the high-speed radio access systems based on the standards described above, standard formulation has been advanced with expanding the old standards to maintain backward compatibility, and thus, many products are provided with not only the latest standard but also the compatibility with the old standards. This allows a radio station supporting the latest standard and a radio station supporting only the old standards to communicate with each other.

CITATION LIST

Non Patent Literature

NPL 1: IEEE Std 802.11ac-2013, December 2013.

SUMMARY OF THE INVENTION

Technical Problem

To date, in an actual communication environment in which terminal stations supporting different standards and communication schemes coexist, radio communication is performed with each terminal station by providing a radio base station mounted with a radio communication unit configured to support a plurality of standards and communication schemes. In the case of such coexisting environment, to maintain backward compatibility, a radio frame based on the old standards may be used even when a radio frame based on new standard can be used. That is, a high-efficiency radio frame defined in the new standard cannot be used in some cases. Moreover, there is a problem in that the transmission efficiency of the entire system is lowered due to the coexistence of the radio frames based on the old standards with poor transmission efficiency.

An object of the present invention is to provide a radio communication method and a base station, in which the base station includes a plurality of radio communication units configured to individually support a plurality of communication capabilities, and can perform, for a terminal station that is connected to the base station, control for selecting a radio communication unit based on a communication scheme supported in the terminal station.

Means for Solving the Problem

A first invention relates to a radio communication method for a radio communication system including a plurality of base stations provided with a plurality of radio communication units for which different communication schemes are settable, and a terminal station configured to perform radio communication with the radio communication unit of the base station by using a specific communication scheme, the radio communication method including setting, at the base station, for the radio communication units, different communication schemes based on a setting policy of the communication scheme, and a switching policy used for selecting the radio communication unit to which the terminal station is to be connected, and collecting, at the base station, communication scheme information on a communication scheme selectable by the terminal station when the terminal station establishes a connection or a reconnection with the base station, and selecting at the base station, a radio communication unit to which the terminal station is to be connected in accordance with the communication scheme information, the setting policy and the switching policy, and updating, at the base station, the setting policy and the switching policy for the radio communication unit based on the communication scheme information.

A second invention relates to a radio communication method for a radio communication system including a plurality of base stations provided with a plurality of radio communication units for which different communication schemes are settable, and a terminal station configured to perform radio communication with the radio communication unit of the base station by using a specific communication scheme, and the radio communication method includes setting, at the base station, for the radio communication units, different communication schemes based on a setting policy of the communication scheme, and a switching policy used for selecting the radio communication unit to which the terminal station is to be connected, and collecting, at the base station, with respect to a terminal station that is already connected to the base station, communication scheme information on a communication scheme selectable by the terminal station, and selecting, at the base station, a radio communication unit to which the terminal station is to be connected, in accordance with the communication scheme information, the setting policy, and the switching policy, and updating, at the base station, the setting policy and the switching policy for the radio communication unit based on the communication scheme information.

In the radio communication method according to the first or the second invention, the setting policy and the switching policy are set based on availability of single-user MIMO transmission or multi-user MIMO transmission.

In the radio communication method according to the first or the second invention, the setting policy and the switching policy are set based on availability of multi-user RTS-CTS.

A third invention relates to abase station of a radio communication system including a plurality of base stations provided with a plurality of radio communication units for which different communication schemes are settable, and a terminal station configured to perform radio communication with the radio communication unit of the base station by using a specific communication scheme, the base station including a unit configured to set, for the radio communication units, different communication schemes based on a setting policy of the communication scheme, and a switching policy used for selecting the radio communication unit to which the terminal station is to be connected, a unit configured to collect communication scheme information on a communication scheme selectable by the terminal station when the terminal station establishes a connection or a reconnection with the base station, a unit configured to select a radio communication unit to which the terminal station is to be connected, in accordance with the communication scheme information, the setting policy, and the switching policy, and a unit configured to update the setting policy and the switching policy for the radio communication unit based on the communication scheme information.

A fourth invention relates to abase station of a radio communication system including a plurality of base stations provided with a plurality of radio communication units for which different communication schemes are settable, and a terminal station configured to perform radio communication with the radio communication unit of the base station by using a specific communication scheme, the base station including a unit configured to set, for the radio communication units, different communication schemes based on a setting policy of the communication scheme, and a switching policy used for selecting the radio communication unit to which the terminal station is to be connected, a unit configured to collect, with respect to a terminal station that is already connected to the base station, communication scheme information on a communication scheme selectable by the terminal station, a unit configured to select a radio communication unit to which the terminal station is to be connected, in accordance with the communication scheme information, the setting policy, and the switching policy, and a unit configured to update the setting policy and the switching policy for the radio communication unit based on the communication scheme information.

Effects of the Invention

In the present invention, the base station characterizes, by using a setting policy of a communication scheme, a plurality of radio communication units for which different communication schemes can be set, and then connects a terminal station to a specified radio communication unit in accordance with a switching policy. Thus, the effect of each radio frame can be maximized and the transmission efficiency can be improved.

BRIEF DESCRIPTION OF DRAWINGS

FIGS. 5(1) and 5(2) are time charts illustrating examples in which terminal stations are accommodated, depending on their types, in each of the radio communication units.

DESCRIPTION OF EMBODIMENTS

Figure 1:
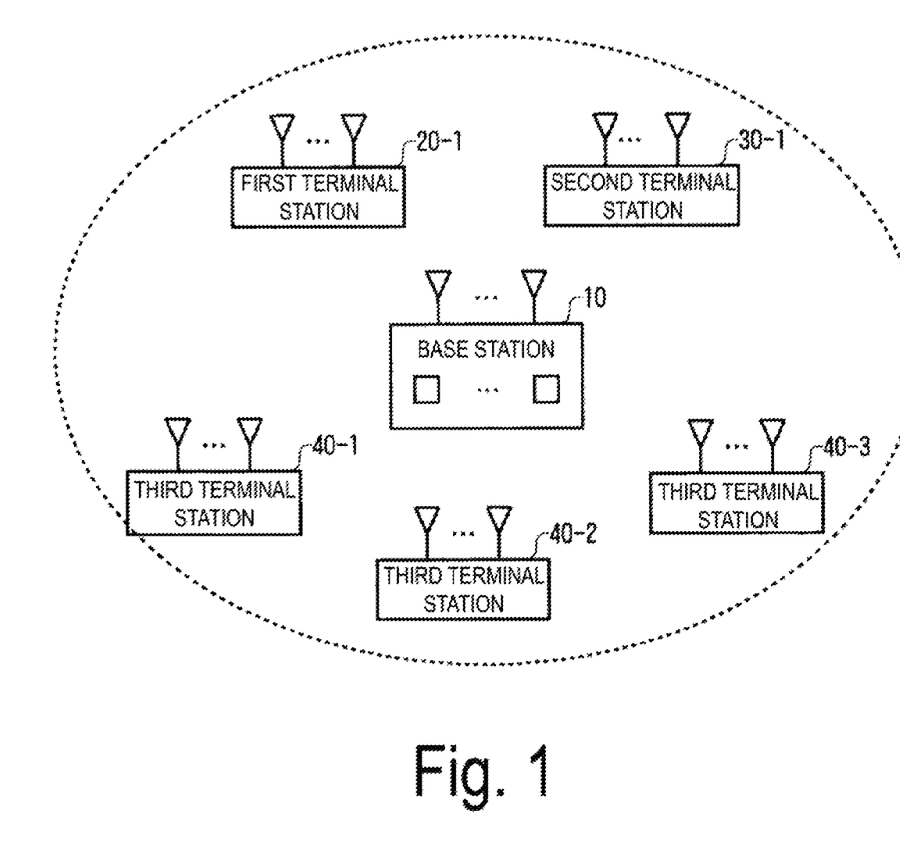
FIG. 1 is a diagram illustrating a configuration example of a radio communication system according to the present invention.

FIG. 1 illustrates a configuration example of a radio communication system according to the present invention. In FIG. 1, the configuration includes a base station 10 including a plurality of radio communication units, a first terminal station 20-1, a second terminal station 30-1 that supports a different standard or communication scheme from the first terminal station, and third terminal stations 40-1 to 40-3 that support a different standard or communication scheme from the first terminal station and the second terminal station, and the terminal stations are present in a service area that is an area where radio communication with the base station 10 is available. Here, the first terminal station to the third terminal station may each be one or more.

Figure 2:
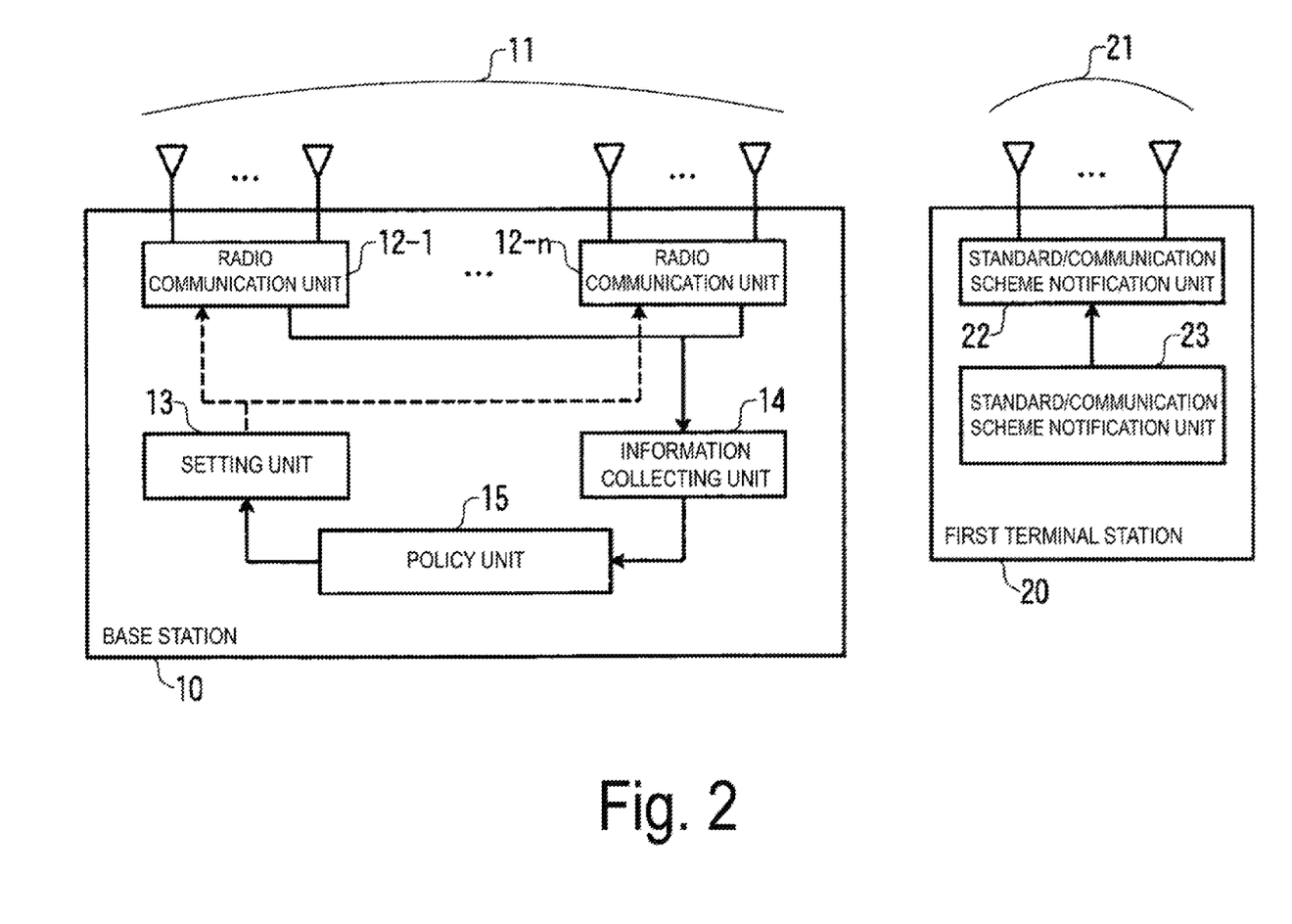
FIG. 2 is a diagram illustrating a configuration example of a base station and a first terminal station.

FIG. 2 illustrates a configuration example of the base station and the first terminal station.

In FIG. 2, the base station 10 includes an antenna 11, a plurality of radio communication units 12-1 to 12-n, a setting unit 13, an information collecting unit 14, and a policy unit 15. Note that functional blocks generally mounted on a base station are omitted.

The antenna 11 is connected to the radio communication units 12-1 to 12-n, transmits a radio frame being input from the radio communication units 12-1 to 12-n, and outputs received radio frame to the radio communication units 12-1 to 12-n.

The radio communication units 12-1 to 12-n have three functions of a radio communication function, a terminal station connection switching function, and an information collecting function. With the radio communication function, the radio communication units 12-1 to 12-n independently performs radio communication, via the antenna 11, with the terminal station by using a standard or communication scheme that is set by a setting policy being input previously from the setting unit 13. With the terminal station connection switching function, connection switching of the terminal station is performed based on a switching policy that relates to connectability of terminal station and input from the setting unit 13. With the information collecting function, information of standard or communication scheme selectable by the terminal station and connection information of the terminal station are collected, and then output to the information collecting unit 14.

The setting unit 13 sets, to each of the radio communication units 12-1 to 12-n, inputs of a setting policy of a standard or communication scheme for each of the radio communication units 12-1 to 12-n and a switching policy for determining a radio communication unit to which a terminal station is to be connected.

The information collecting unit 14 acquires the information on the standard or communication scheme for selecting a terminal station from each of the radio communication units 12-1 to 12-n and the connection information of the terminal station, then lists the information to output the information to the policy unit 15.

Based on the information on the standard or communication scheme selectable by the terminal station and the connection information of the terminal station that are input from the information collecting unit 14, the policy unit 15 calculates a setting policy of a standard or communication scheme to be set to each of the radio communication units 12-1 to 12-n and a switching policy for determining a radio communication unit to which the terminal station is to be connected, then outputs the policies to the setting unit 13.

The first terminal station 20 includes an antenna 21, a radio communication unit 22, and a standard/communication scheme notification unit 23. Note that functional blocks generally mounted on a terminal station are omitted.

The antenna 21 is connected to the radio communication unit 22, transmits a radio frame being input from the radio communication unit 22, and outputs received radio frame to the radio communication unit 22. The standard/communication scheme notification unit 23 outputs information of a standard or communication scheme selectable by the first terminal station 20 to the radio communication unit 22, and the radio communication unit 22 transmits the information as radio packet.

The second terminal station 30 and the third terminal station 40 also have a similar configuration, but support the standard or communication scheme different from that of the first terminal station 20.

Figure 3:
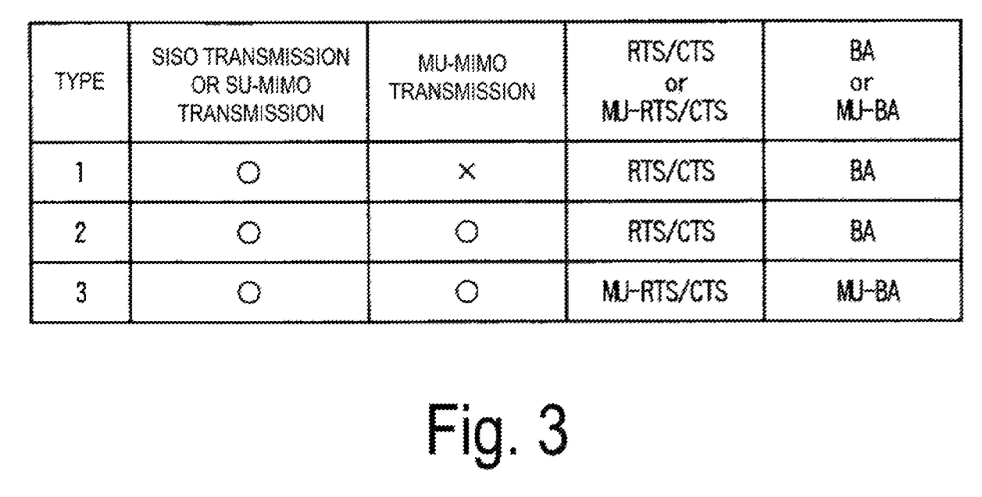
FIG. 3 is a table showing an example of types of terminal stations according to the present invention.

FIG. 3 illustrates an example of types of terminal stations according to the present invention.

In FIG. 3, the first column represents a type and there are type 1 to type 3. The second column is for a transmission scheme based on the assumption that one base station and one terminal station communicate with each other, and represents availability of Single-Input Single-Output (SISO) transmission in which the base station and the terminal station use only one antenna to perform transmission or Single-User Multiple-Input Multiple-Output (SU-MIMO) transmission in which the base station and the terminal station use a plurality of antennas to perform transmission. The third column represents availability of Multiple-User MIMO (MU-MIMO) transmission in which one base station and a plurality of terminal stations simultaneously perform communication. The fourth column represents availability of Request to Send (RTS) and Clear to Send (CTS) or MU-RTS or CTS for the prevention of hidden terminals. The fifth column represents availability of Block Acknowledgment (BA) or MU-BA for acknowledging radios packet communications.

Here, the first terminal station 20-1 illustrated in FIG. 1 supports a communication scheme of type 1, the second terminal station 30-1 supports a communication scheme of type 2, and the third terminal stations 40-1 to 40-3 support a communication scheme of type 3. The radio communication units 12-1 to 12-n of the base station 10 perform setting corresponding to each type of the terminal stations, but typically, the radio communication units perform setting corresponding to all of the type 1 to type 3 to maintain backward compatibility. Thus, any type of terminal station can be connected to any of the radio communication units 12-1 to 12-n of the base station 10.

Figure 4:
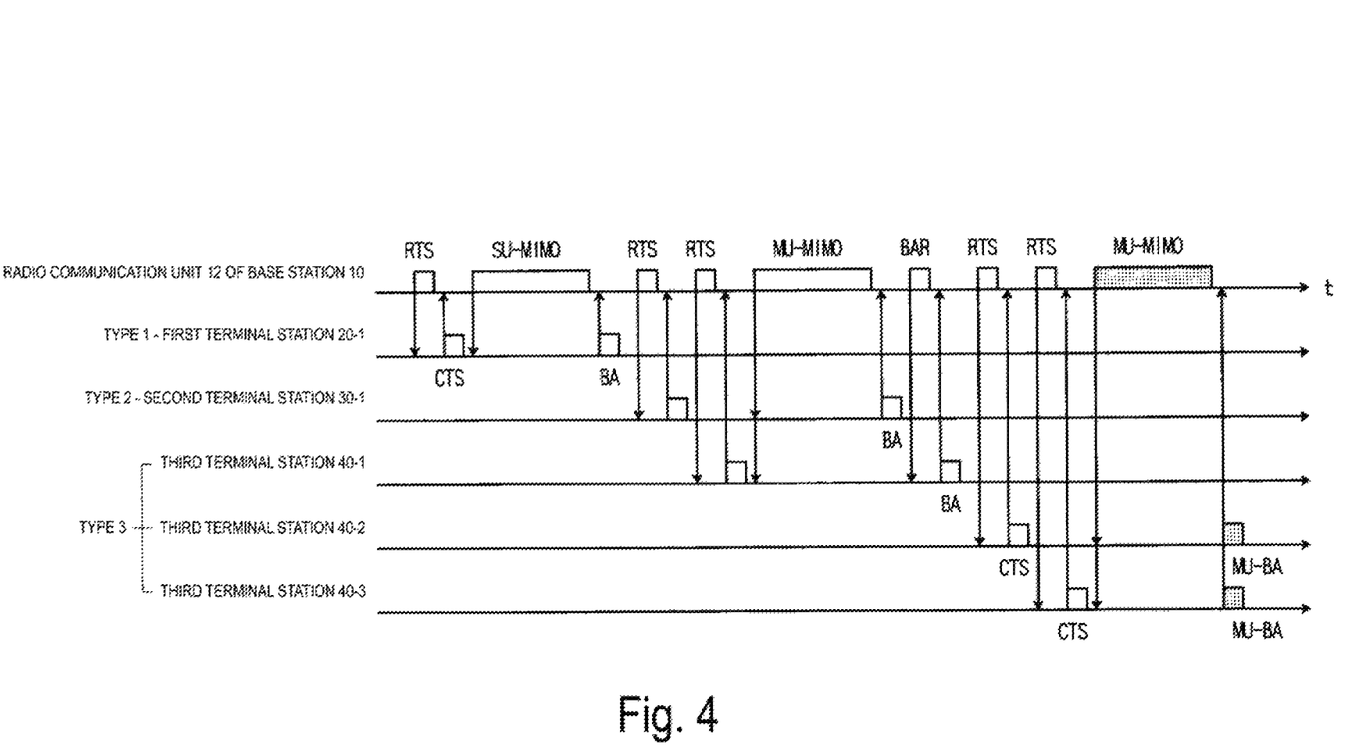
FIG. 4 is a time chart illustrating an example in which a plurality of types of terminal stations are English Translation of accommodated in one radio communication unit.
Figure 5:
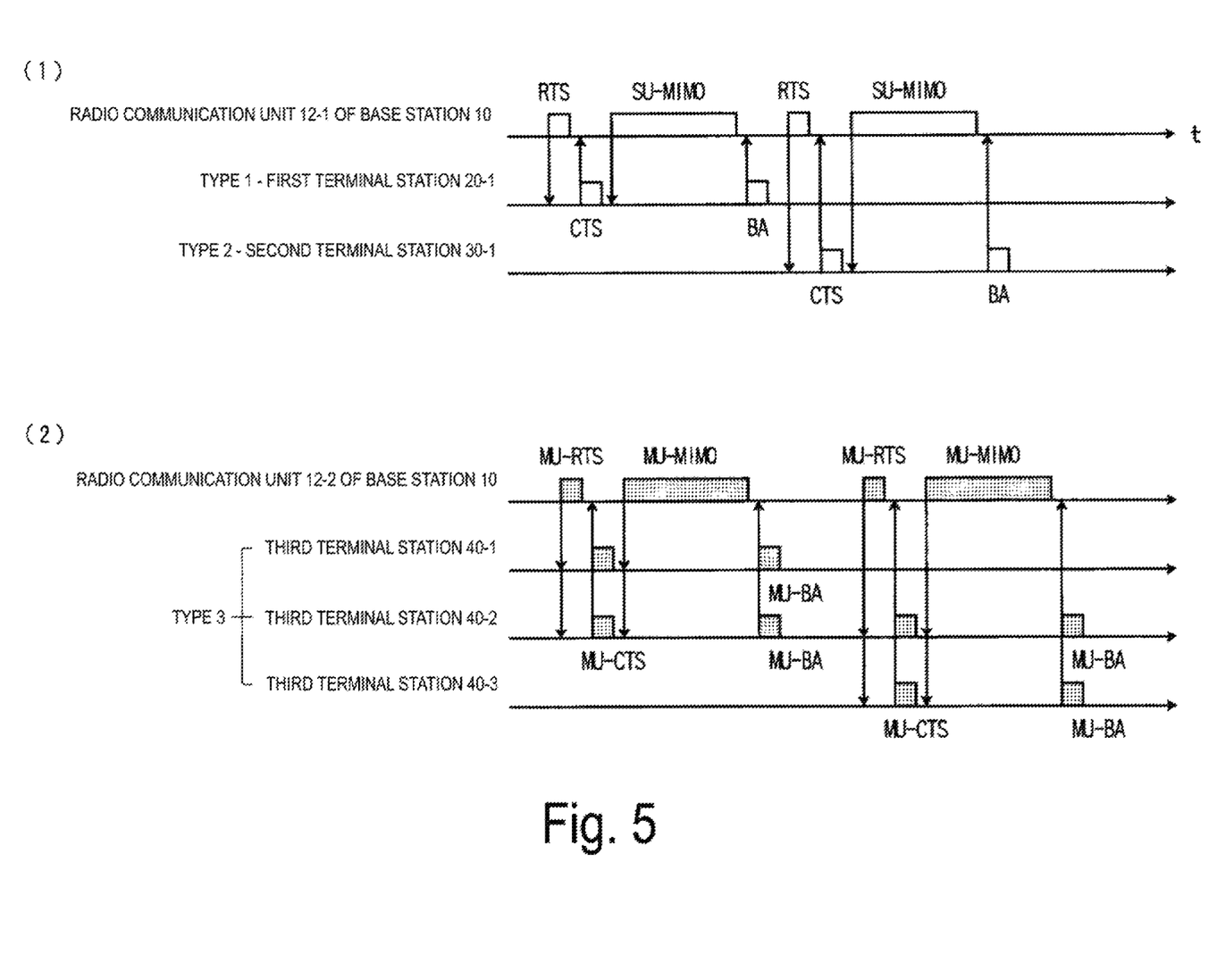

FIG. 4 illustrates an example in which a plurality of types of terminal stations are accommodated in one radio communication unit.

In FIG. 4, in the first terminal station 20-1 of type 1, MU-MIMO transmission which is multi-user transmission is not available, and thus, the first terminal station 20-1 of type 1 performs radio communication alone. Specifically, the first terminal station 20-1 of type 1 performs RTS/CTS in advance, then performs SU-MIMO transmission, and performs BA at the end.

On the other hand, in the second terminal station 30-1 of type 2 and the third terminal stations 40-1 to 40-3 of type 3, MU-MIMO transmission is available, and thus, MU-MIMO transmission is performed by using a combination of the terminal station of type 2 and the terminal station of type 3 or a combination of the terminal stations of type 3. In MU-MIMO transmission by using a combination of the second terminal station 30-1 of type 2 and the third terminal station 40-1 of type 3, the terminal station of type 3 performs MU-MIMO transmission in accordance with type 2 to maintain compatibility with type 2. Specifically, RTS/CTS is performed for each terminal station, then MU-MIMO transmission is performed, and response confirmation is performed individually by using BA Request (BAR) at the end.

In MU-MIMO transmission by using a combination of the third terminal station 40-2 of types 3 and the third terminal station 40-3 of types 3, MU-RTS/CTS can be used. However, in the present system, there are terminal stations of type 1 and type 2 that cannot receive such type of frais, and thus, the effect of these frames cannot be provided throughout the system. As such, MU-MIMO transmission in accordance with other types may be selected. Specifically, RTS/CTS is performed for each terminal station, then MU-MIMO transmission is performed, and response confirmation is collectively performed by using Multi User BA (MU-BA) at the end.

Thus, in an environment in which there are multiple types, the effect of a newly defined radio frame may not be sufficiently exhibited.

FIGS. 5(1) and 5(2) illustrate examples in which terminal stations are accommodated, depending on their types, in each of the radio communication units.

In FIG. 5(1), the radio communication unit 12-1 of the base station 10 is connected with the first terminal station 20-1 of type 1 and the second terminal station 30-1 of type 2. In the first terminal station 20-1 of type 1, MU-MIMO transmission which is multi-user transmission is not available, and thus, the first terminal station 20-1 of type 1 and the second terminal station 30-1 of type 2 perform RTS/CTS in advance, then perform SU-MIMO transmission, and perform BA at the end.

In FIG. 5(2), the radio communication unit 12-2 of the base station 10 is connected with the third terminal stations 40-1 to 40-3 of type 3. In MU-MIMO transmission by using a combination of the terminal stations of type 3, MU-RTS/CTS can be used, and thus, MU-RTS/CTS is performed for each terminal station, then MU-MIMO transmission is performed, and response confirmation is collectively performed by using MU-BA at the end.

In this manner, to maximize utilization of the function of the terminal station of type 3, it is desirable to separate the terminal stations of type 3 from the terminal stations of older type 1 and type 2, and accommodate the terminal stations in each of the radio communication units. Accordingly, each of the radio communication units 12-1 to 12-$n$ are set with a setting policy corresponding to a standard or communication scheme selectable by a terminal station and a switching policy for determining a radio communication unit to which a terminal station is to be English Translation of connected.

Figure 6:
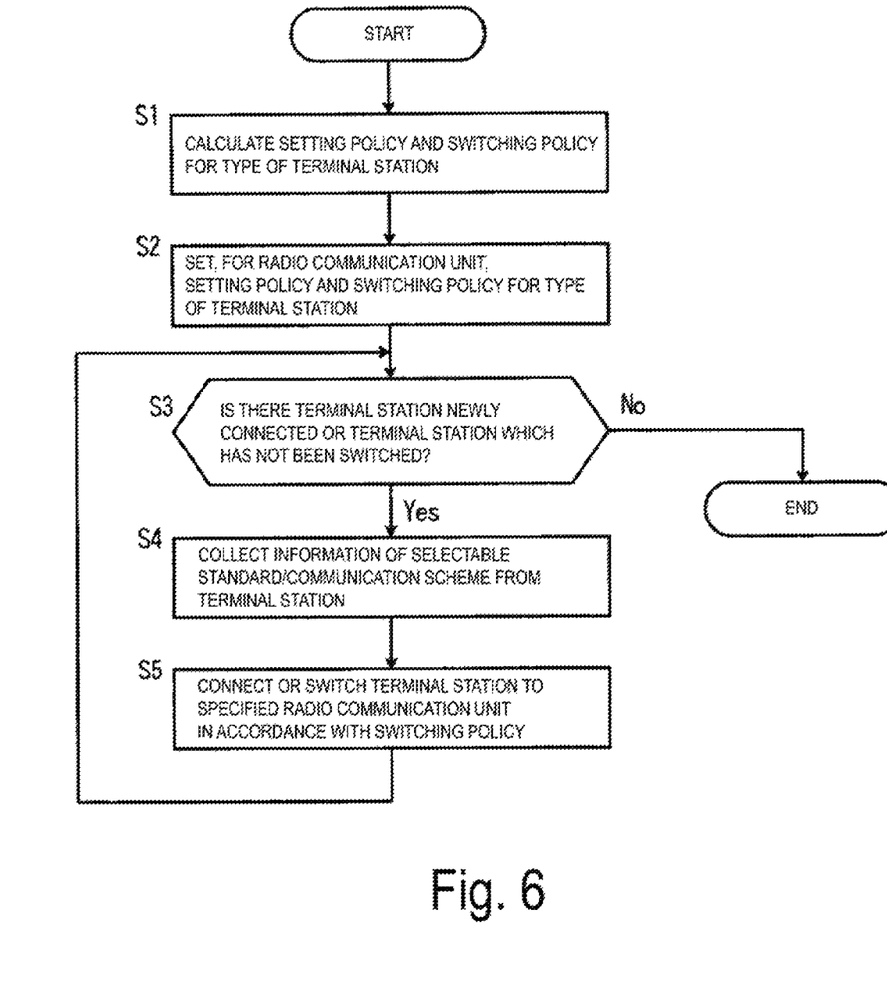
FIG. 6 is a flowchart illustrating an example of a control procedure based on a setting policy and a switching policy according to the present invention.

FIG. 6 illustrates an example of a control procedure based on a setting policy and a switching policy according to the present invention.

Here, in a radio communication system in a related art, a terminal station to be connected to the base station 10 randomly selects a radio communication unit from the radio communication units 12-1 to 12-$n$ of the base station 10 and is connected to the selected radio communication unit. In the present invention, to specify a radio communication unit to which a terminal station is to be connected, control is performed using a setting policy and a switching policy that are set for each of the radio communication units.

In FIG. 2 and FIG. 6, the policy unit 15 of the base station 10 calculates (S1) a setting policy and a switching policy for a type of terminal station. The base station 10 sets, for the radio communication units 12-1 to 12-$n$, the setting policy and the switching policy for the type of terminal station (S2). The above is an initial setting.

Next, the base station 10 determines whether or not there is a terminal station which is newly connected or a terminal station which has not been switched (S3), and if there are any, collects information of a selectable standard or communication scheme from the terminal station (S4), connects or switches the terminal station to a specified radio communication unit in accordance with the switching policy (S5), then repeats these steps until there is no terminal station which has not been switched to finish the procedure.

Note that as a specific switching method of switching a connection destination of a terminal station to another radio communication unit 12, the base station 10 can transmit a Deauthentication frame, a Disassociation frame, or the like to disconnect the radio connection with the terminal station, and ignore or reject reconnection request to radio communication units other than a radio communication unit that is the connection destination after switching, or instruct the terminal station to reconnect to a specified radio communication unit.

Figure 7:
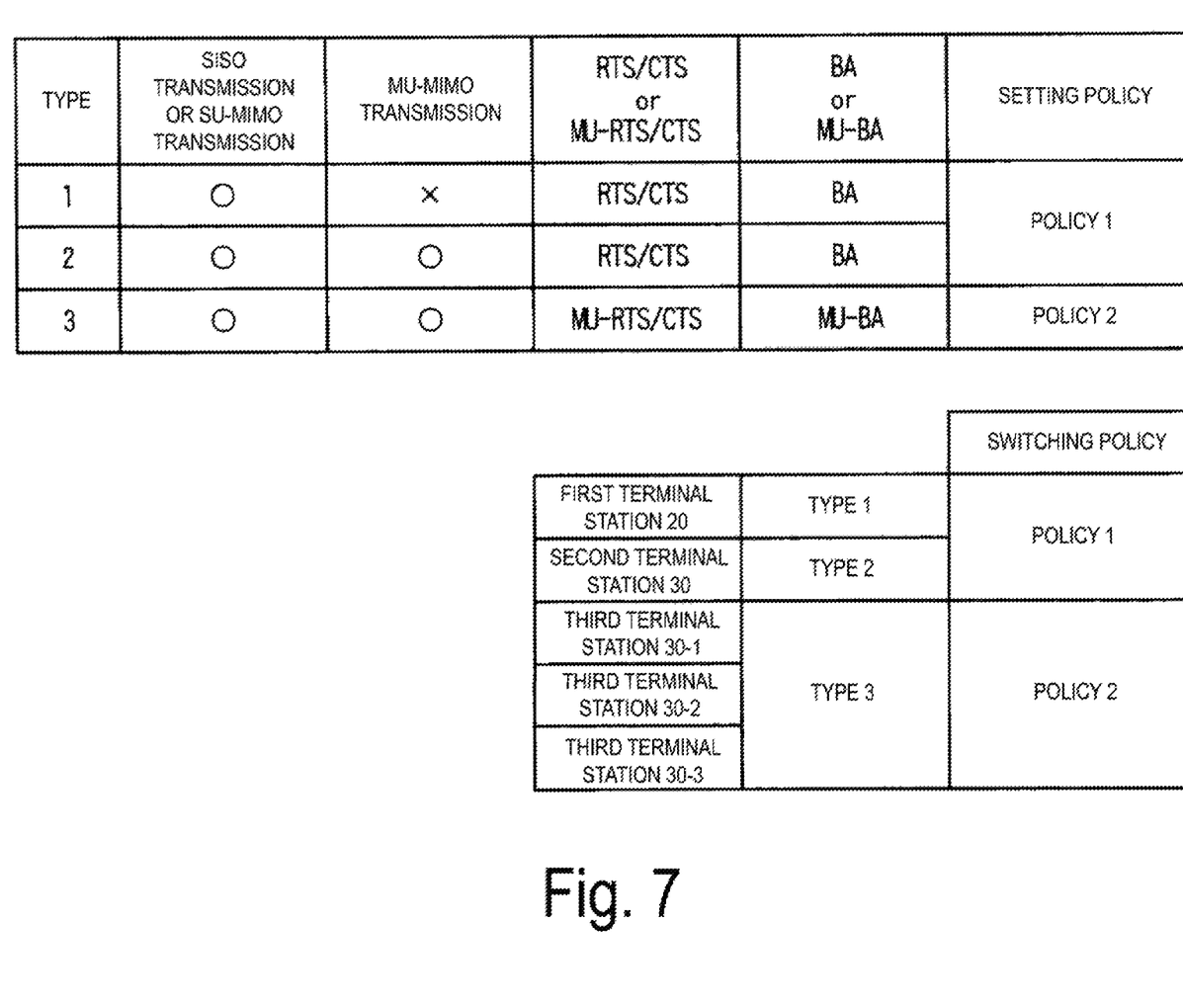
FIG. 7 is a diagram illustrating relationship between the setting policy and the switching policy according to the present invention.

FIG. 7 illustrates relationship between the setting policy and the switching policy according to the present invention.

In FIG. 7, settings corresponding to type 1 and type 2 of the terminal station are defined as a setting policy 1 and a switching policy 1, and settings corresponding to type 3 of the terminal station are defined as a setting policy 2 and a switching policy 3. Here, the setting policy and the switching policy are the same, but they may be different.

In the examples illustrated in FIGS. 5(1) and 5(2), control is performed so that the setting policy 1 and the switching policy 1 are set for the radio communication unit 12-1 of the base station 10, and the radio communication unit 12-1 is connected with the first terminal station 20-1 of type 1 and the second terminal station 30-1 of type 2. If the third terminal station 40-1 of type 3 is connected to the radio communication unit 12-1, switching is performed, in accordance with the switching policy 2, to the radio communication unit 12-2 having the setting policy 2 for accommodating the terminal station of type 3.

Additionally, control is performed so that the setting policy 2 and the switching policy 2 are set for the radio communication unit 12-2 of the base station 10, and the radio communication unit 12-2 is connected with the third terminal stations 40-1 to 40-3 of type 3. If the first terminal station 20-1 of type 1 is connected to the radio communication unit 12-2, switching is performed, in accordance with the switching policy 1, to the radio communication unit 12-1 having the setting policy 1 for accommodating the terminal station of type 1.

Figure 8:
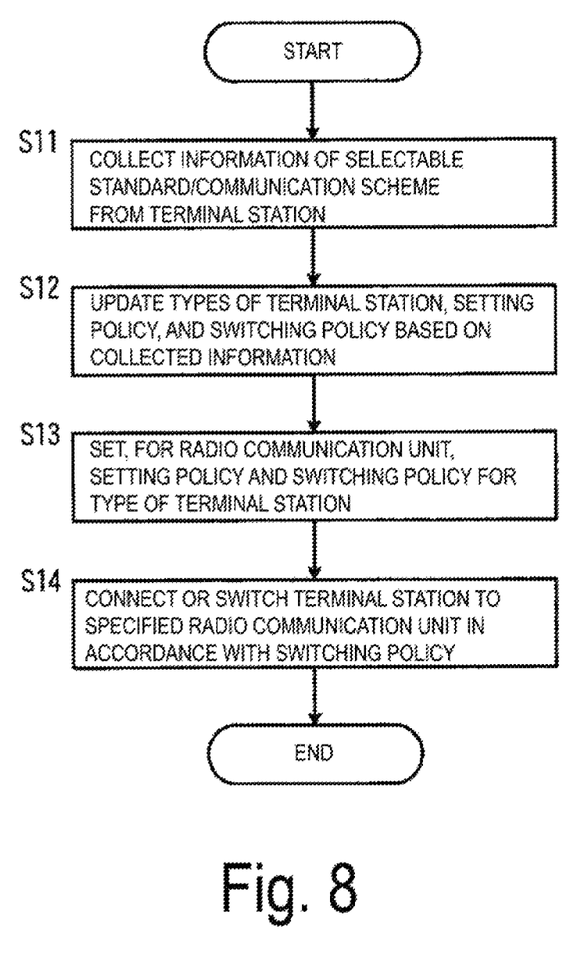
FIG. 8 is a flowchart illustrating an example of an update procedure of the setting policy and the switching policy according to the present invention.

FIG. 8 illustrates an example of an update procedure of the setting policy and the switching policy according to the present invention.

In FIG. 8, the base station 10 collects information of a selectable standard or communication scheme from each terminal station (S11), and updates, based on the collected information, the type of terminal station, the setting policy, and the switching policy, if necessary (S12). Next, in a case where at least one of the types of terminal station, the setting policy, and the switching policy is updated, the base station 10 sets the updated contents for the radio communication units 12-1 to 12-$n$ (S13). Each of the radio communication units 12-1 to 12-$n$ connects or switches the terminal station to a specified radio communication unit based on the setting contents of the setting policy and the switching policy (S14).

Figure 9:
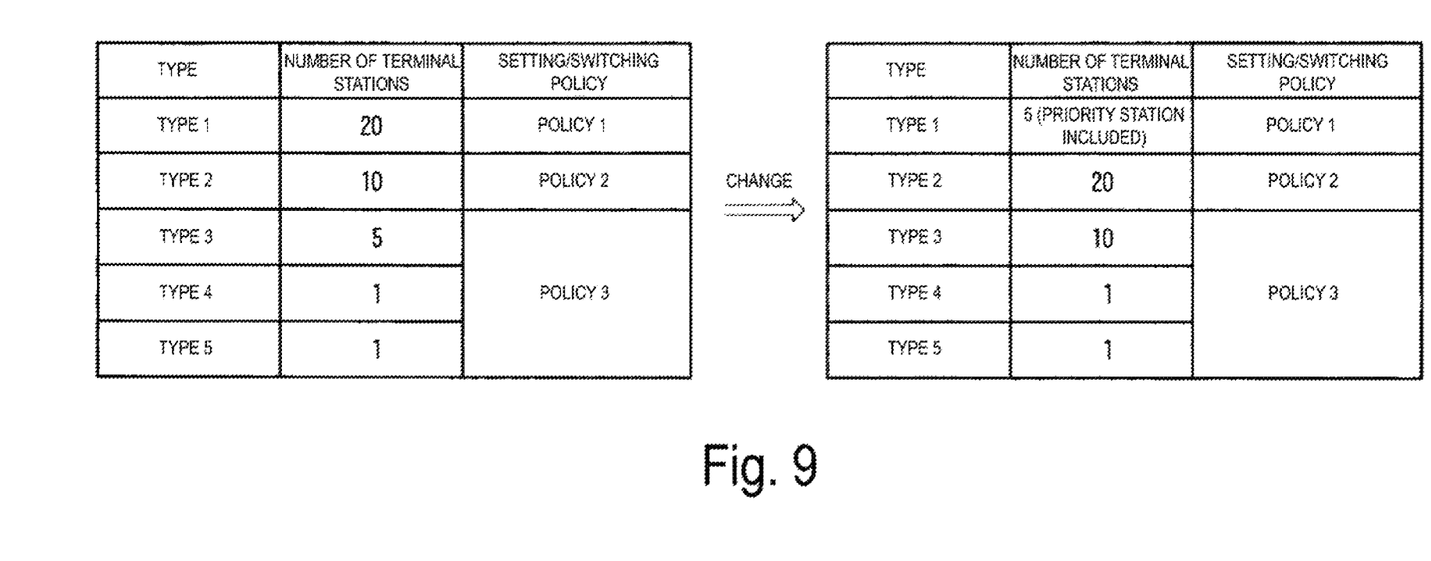
FIG. 9 is a diagram illustrating an update example of the setting/switching policy.

FIG. 9 illustrates an update example of the setting/switching policy.

In FIG. 9, type 1 to type 5 are initially set by the number of terminal stations that can be accommodated in the radio communication unit, and a setting/switching policy 1 is specified for type 1, a setting/switching policy 2 is specified for type 2, and a setting/switching policy 3 is specified for type 3 to type 5. Here, if there is a terminal station to be prioritized, the setting/switching policy is updated by taking into consideration of the priorities. Five terminal stations including the priority station are set to type 1, then the types for each number of terminal stations are carried down, and the setting/switching policy 1 is specified for type 1, the setting/switching policy 2 is specified for type 2, and the setting/switching policy 3 is specified for type 3 to type 5.

As the switching policy, information such as connection time, traffic for connection, or a communication application may be used, for example.

REFERENCE SIGNS LIST

10 Base station
11 Antenna
12 Radio communication unit
13 Setting unit

14 Information collecting unit
15 Policy unit
20 First terminal station
21 Antenna
22 Radio communication unit
23 Standard/communication scheme notification unit

The invention claimed is:

1. A radio communication method for a radio communication system, the radio communication system including a base station provided with a plurality of radio communication units for each of which a plurality of communication schemes are settable, and a terminal station configured to perform radio communication with any one of the plurality of radio communication units by using a specific communication scheme, the radio communication method comprising:

setting, at the base station, for the plurality of radio communication units, a setting policy that specifies the communication scheme to be adopted by a given radio communication unit, and a switching policy corresponding to communication scheme information of a terminal station that is permitted to connect to the given radio communication unit;

collecting, at the base station, communication scheme information on a communication scheme selectable by the terminal station, when the terminal station establishes a connection or a reconnection with the base station;

selecting, at the base station, a radio communication unit to which the terminal station is to be connected, in accordance with the communication scheme information, and the switching policy; and updating, at the base station, the setting policy and the switching policy for the radio communication unit based on the communication scheme information.

2. The radio communication method according to claim 1, wherein
the setting policy and the switching policy are set based on availability of single-user MIMO transmission or multi-user MIMO transmission.

3. The radio communication method according to claim 1, wherein
the setting policy and the switching policy are set based on availability of multi-user RTS-CTS.

4. A radio communication method for a radio communication system, the radio communication system including a base station provided with a plurality of radio communication units for each of which a plurality of communication schemes are settable, and a terminal station configured to perform radio communication with any one of the plurality of radio communication units by using a specific communication scheme, the radio communication method comprising:

setting, at the base station, for the plurality of radio communication units, a setting policy that specifies the communication scheme to be adopted by each radio communication unit, and a switching policy corresponding to communication scheme information of a terminal station allowing connection to each radio communication unit;

collecting, at the base station, with respect to a terminal station that is already connected to the base station, communication scheme information on a communication scheme selectable by the terminal station;

selecting, at the base station, a radio communication unit to which the terminal station is to be connected, in accordance with the communication scheme information, and the switching policy; and updating, at the base station, the setting policy and the switching policy for the radio communication unit based on the communication scheme information.

5. The radio communication method according to claim 4, wherein
the setting policy and the switching policy are set based on availability of single-user MIMO transmission or multi-user MIMO transmission.

6. The radio communication method according to claim 4, wherein
the setting policy and the switching policy are set based on availability of multi-user RTS-CTS.

7. A base station of a radio communication system, the radio communication system including a base station provided with a plurality of radio communication units for each of which a plurality of communication schemes are settable, and a terminal station configured to perform radio communication with any one of the plurality of radio communication units by using a specific communication scheme, the base station comprising:

a unit configured to set, for the plurality of radio communication units, a setting policy that specifies the communication scheme to be adopted by each radio communication unit, and a switching policy corresponding to communication scheme information of a terminal station allowing connection to each radio communication unit;

a unit configured to collect communication scheme information on a communication scheme selectable by the terminal station, when the terminal station establishes a connection or a reconnection with the base station;

a unit configured to select a radio communication unit to which the terminal station is to be connected, in accordance with the communication scheme information, and the switching policy; and a unit configured to update the setting policy and the switching policy for the radio communication unit based on the communication scheme information.

* * * * *